US 11,644,896 B2

(12) United States Patent
Nistico et al.

(10) Patent No.: US 11,644,896 B2
(45) Date of Patent: *May 9, 2023

(54) INTERACTIVE MOTION-BASED EYE TRACKING CALIBRATION

(71) Applicant: APPLE INC., Cupertino, CA (US)

(72) Inventors: Walter Nistico, Berlin (DE); Andrii Nikiforov, Berlin (DE); Borys Lysyansky, Berlin (DE)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/707,013

(22) Filed: Mar. 29, 2022

(65) Prior Publication Data

US 2022/0214747 A1    Jul. 7, 2022

Related U.S. Application Data

(63) Continuation of application No. 17/196,403, filed on Mar. 9, 2021, now Pat. No. 11,320,904, which is a
(Continued)

(30) Foreign Application Priority Data

Jun. 13, 2016   (EP) ...................................... 16174256

(51) Int. Cl.
  *G06F 3/01*   (2006.01)
  *G06V 40/19*  (2022.01)
  *G06V 40/18*  (2022.01)
(52) U.S. Cl.
  CPC .............. *G06F 3/013* (2013.01); *G06V 40/19* (2022.01); *G06V 40/193* (2022.01); *G06F 2203/011* (2013.01)

(58) Field of Classification Search
  None
  See application file for complete search history.

(56) References Cited

U.S. PATENT DOCUMENTS 10,976,813 B2    4/2021   Nistico et al.

FOREIGN PATENT DOCUMENTS

WO     2016073131 A1    5/2016

OTHER PUBLICATIONS

Ken Pfeuffer et al., "Pursuit Calibration: Making Gaze Calibration Less Tedious and More Flexible," In Proceedings of the 26th annual ACM symposium on User interface software and technology, 2013, pp. 261-270.
(Continued)

*Primary Examiner* — Brian M Butcher
(74) *Attorney, Agent, or Firm* — Fernando & Partners, LLP

(57) ABSTRACT

The invention is concerned with a method for performing a calibration procedure for calibrating an eye tracking device (12), wherein a stimulus object (S) is displayed within a certain display area (22), such that the stimulus object (S) is at least temporarily moving along a defined trajectory (26) and images of at least one eye (16) of at least one user (18) are captured during the displaying of the stimulus object (S). Based on the captured images gaze data are provided and in dependency of the gaze data gaze points (P) of the at least one eye (16) of the user (18) with respect to the display area (22) are determined. Further, at least one calibration parameter (a1; a2; a3; a4; a5; a6; a7; a8; a9; a10; a11; a12; a13; a14; Θ; R; K; a; b; r) of at least one predefined calibration model (M, M1, M2, M3, M4, M5, M6) is determined in dependency of a first analysis at least of positions of at least part of the respective gaze points (P) with regard to the defined trajectory (26) of the stimulus object (S). Further, at
(Continued)

Figure 1:
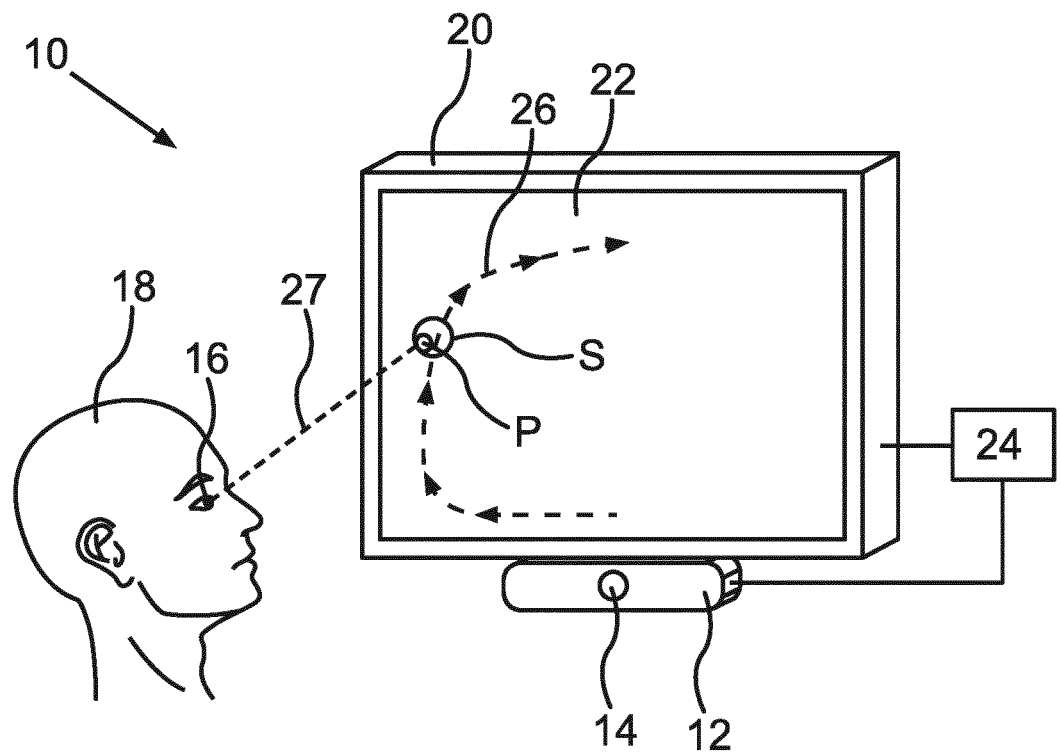

least one control parameter (N, (A, D), T) is determined in dependency of at least part of the captured gaze data and controlling the execution of at least part of the calibration procedure in dependency of the at least one determined control parameter (N, (A, D), T).

20 Claims, 6 Drawing Sheets

Related U.S. Application Data continuation of application No. 16/308,804, filed as application No. PCT/EP2017/064315 on Jun. 12, 2017, now Pat. No. 10,976,813.

(56) References Cited

OTHER PUBLICATIONS

PCT International Search Report and Written Opinion dated Aug. 31, 2017, PCT International Application No. PCT/EP2017/064315, pp. 1-16.

PCT International Preliminary Report on Patentability dated Dec. 27, 2018, PCT International Application No. PCT/EP2017/064315, pp. 1-9.

| Q | O | C | M | T(RP) | T(CP) | N | (A,D) |
|---|---|---|---|---|---|---|---|
| 8 | 2 | 14 | $x' = a_1 x^2 + a_2 xy + a_3 y^2 + a_4 x + a_5 y + a_6 v_x + a_7$<br>$y' = a_8 x^2 + a_9 xy + a_{10} y^2 + a_{11} x + a_{12} y + a_{13} v_y + a_{14}$ | 4L | — | N8 | (A8,D8) |
| 7 | 2 | 12 | $x' = a_1 x^2 + a_2 xy + a_3 y^2 + a_4 x + a_5 y + a_6$<br>$y' = a_7 x^2 + a_8 xy + a_9 y^2 + a_{10} x + a_{11} y + a_{12}$ | — | — | N7 | (A7,D7) |
| 6 | 2 | 10 | $x' = a_1 xy + a_2 x + a_3 y + a_4 v_x + a_5$<br>$y' = a_6 xy + a_7 x + a_8 y + a_9 v_y + a_{10}$ | 3L & 1S | — | N6 | (A6,D6) |
| 5 | 2 | 8 | $x' = a_1 xy + a_2 x + a_3 y + a_4$<br>$y' = a_5 xy + a_6 x + a_7 y + a_8$ | 3L or 4L | — | N5 | (A5,D5) |
| 4 | 1 | 6 | $x' = a_1 x + a_2 y + a_3$<br>$y' = a_4 x + a_5 y + a_6$ | 3S | — | N4 | (A4,D4) |
| 3 | 1 | 4 | $x' = a_1 x + a_2$<br>$y' = a_3 y + a_4$ | 2S | 2S | N3 | (A3,D3) |
| 2 | 1 | 2 | $x' = x + a_1$<br>$y' = y + a_2$ | 1S | 1S | N2 | (A2,D2) |
| 1 | 1 | 0 | $x' = x$<br>$y' = y$ | otherwise | otherwise | N1 | (A1,D1) |

Fig.5

INTERACTIVE MOTION-BASED EYE TRACKING CALIBRATION

CROSS-REFERENCE TO RELATED APPLICATIONS

This application is a continuation of U.S. patent application Ser. No. 17/196,403, filed on Mar. 9, 2021, which is a continuation of U.S. patent application Ser. No. 16/308,804, filed on Dec. 10, 2018, which is the national stage entry of Intl. Patent App. No. PCT/EP2017/064315, filed on Jun. 12, 2017, which claims priority to European Patent App. No. 16174256.4, filed on Jun. 13, 2016, which are all hereby incorporated by reference in their entirety.

The invention is concerned with a method for performing a calibration procedure for calibrating an eye tracking device, wherein a stimulus object is displayed within a certain display area, such that the stimulus object is at least temporarily moving along a defined trajectory and images of at least one eye of at least one user are captured during the displaying of the stimulus object. Based on the captured images gaze data are provided and in dependency of the gaze data gaze points of the at least one eye of the user with respect to the display area are determined. Further, at least one calibration parameter of at least one predefined calibration model is determined in dependency of a first analysis at least of positions of at least part of the respective gaze points with regard to the defined trajectory of the stimulus object. The invention also relates to an eye tracking system for performing a calibration procedure for calibrating an eye tracking device.

A variety of eye tracking devices and eye tracking systems are known from the prior art. Eye tracking devices are configured to track persons, especially their eyes, their point of regard or gaze direction. As certain properties of human eyes are different from person to person, usually a calibration procedure is performed to calibrate the eye tracking device, so that the accuracy of the determined gaze or gaze point can be improved.

During usual calibration procedures a user is being shown a grid of stimulus points, appearing in sequence one at that time at predefined locations on a screen. Usually 2, 5, 9 or 13 such points are used. A user is required to fixate said points for a sufficient time for the eye tracker to detect the fixation of the user's gaze. By determining the difference between the gaze points measured by the eye tracking device and the positions, on which the stimulus points have been shown on the screen, calibration parameters of a calibration model can be determined, especially such that the difference between the measured gaze points and the positions of the shown stimulus points is minimized in average.

Alternatively, instead of showing static stimulus points also a moving stimulus point can be shown on the screen and the user is correspondingly required to follow the moving stimulus point with his gaze.

However, such usual calibration procedures have a lot of disadvantages. First of all, one has to rely on that the user is actually fixating the stimulus points or follows the moving stimulus point, as the eye tracker cannot reliably detect if the user is sufficiently engaged and is really fixating the points, which he is supposed to fixate, or not. However, if the user does not, this leads to wrong or at least bad calibration results. This again leads to a poor eye tracking accuracy of subsequent eye tracking applications. Further, calibration often has to be repeated to achieve good results, especially with inexperienced users, which results in a time consuming and annoying calibration procedure for the user. Moreover, some users are unwilling or unable to achieve a good calibration, because they cannot accurately fixate the shown stimulus points, like infants, children, people with cognitive disabilities or people with nystagmus.

Therefore, it's an object of the present invention to provide a method for performing a calibration procedure for calibrating an eye tracking device and eye tracking system, which allow for achieving better calibration results.

This object is solved by a method and an eye tracking system with the features according to the respective independent claims. Advantageous embodiments of the invention are subject of the dependent claims, the description and the figures.

According to the method according to the invention for performing a calibration procedure for calibrating an eye tracking device, a stimulus object is displayed within a certain display area, such that the stimulus object is at least temporarily moving along a defined trajectory and images of at least one eye of at least one user are captured during the displaying of the stimulus object. Based on the captured images gaze data are provided and in dependency of the gaze data gaze points of the at least one eye of the user with respect to the display area are determined. Further, at least one calibration parameter of at least one predefined calibration model is determined in dependency of a first analysis at least of positions of at least part of the respective gaze points with regard to the defined trajectory of the stimulus object. Moreover, at least one control parameter is determined in dependency of at least part of the captured gaze data and the execution of at least part of the calibration procedure is controlled in dependency of the at least one determined control parameter.

First of all, by displaying a stimulus object, which is at least temporarily moving, a lot of advantages can be achieved in comparison to just showing static stimulus points. This is due to the fact that the human visual system is biologically engineered to notice moving objects and spontaneously trying to follow them, evolutionarily to identify a potential predator or to follow a pray.

Showing a moving object as a stimulus achieves a greater spontaneous engagement in a user compared to a static stimulus. Also the motion path and velocity can be used as features to compare against the user's uncalibrated gaze, which means the determined gaze points, to determine dynamically his level of engagement, e.g. by determining whether the user gaze path, which is the chronological sequence of the determined gaze points, is substantially in accordance with the motion of the calibration stimulus path, which is the defined trajectory, and capability to follow.

Furthermore, the motion path provides a much larger number of data samples to be used for the calibration compared to the traditional grid of point, as hundreds or thousands of samples, namely determined gaze points, can be provided compared to just a dozen, which allows to properly calibrate the system even when the user is not able to follow the whole path.

But the main advantage of the invention is, that the execution of the calibration procedure does not follow a fixed procedure but instead can be adapted in dependency of at least one determined control parameter. Especially, this is based on the finding that the captured gaze data provide information, which advantageously can be used to control the execution of the calibration procedure to provide better adaption, especially adaption to the properties and capabilities of the user performing the calibration. To name some examples, which are later explained in more detail, the number of determined gaze points, like the total number of determined gaze points or also a number of determined gaze points fulfilling certain criteria, can advantageously serve as such control parameter. Therefore, for example the capability of the user of following the displayed stimulus object can be determined and used for adapting the displaying of the stimulus object, to make it easier for the user to follow and concentrate on the stimulus object. Also the calibration model used for the calibration can be chosen in dependency of the number of determined gaze points. Some models are able to provide more accurate results, however also require more a samples to provide reliable and stable results. Consequently, the invention provides the possibility of taking into account a number of parameters, which can serve as control parameters, like the user engagement and his capability to follow the stimulus object, to provide better and more suitable adaptions for the execution of the calibration procedure. Thereby, the result of the calibration procedure, which is the finally determined at least one calibration parameter, can be significantly enhanced in accuracy. Therefore also better adaptions for the calibration of people, who are unable to fixate points, e.g. due to nystagmus, can be provided, the overall calibration robustness and therefore also the finally achieved eye tracking accuracy by using the calibration results can be improved.

Generally, the stimulus object can be displayed within a 2D or also within a 3D display area. So the display area can be provided by for example a 2D display screen or also by means of stereo displays or other type of 3D display. Correspondingly, the stimulus object can be displayed moving along the defined 2D or 3D trajectory within the 2D or 3D display area.

Also the stimulus object can be displayed e.g. as a stimulus point, but not in the mathematical sense but more like a circle shaped extended stimulus point. Generally, as the stimulus object any arbitrary stimulus image can be displayed. But for the sake of simplicity, this stimulus object may also be called stimulus point or just stimulus in the following.

For providing the display area a head mounted display can be used or also not head mounted, normal screen or monitor. For capturing images of the at least one eye of the user one or more cameras can be used. These one or more cameras can also be integrated in a head mounted system or be provided as remote camera. For providing the gaze data on the basis of the captured images the processing unit can be used, which is capable to analyze the captured images and therefrom derive the gaze data, for example the gaze direction of one or both eyes respectively or an averaged gaze direction of both eyes. The gaze points can be determined with respect to the display area for example by intersecting the corresponding determined gaze directions or gaze vectors with the 2D plane of the 2D display area. The 2D plane not necessarily has to be a flat plane but also can be a curved plane as well. In case of a 3D display area, the 3D gaze point with respect to the display area can be determined for example by intersecting the gaze vectors for the left and the right eye. Additionally or alternatively the gaze vectors of one or two eyes or the averaged gaze vector can be intersected with a display plane comprising a depth coordinate, which corresponds to the depths coordinate of the displayed stimulus object at the time associated with the corresponding capturing of the gaze, on the basis of which the corresponding gaze point is determined. The time associated with the corresponding capturing here does not mean the same time. When using a moving stimulus object, the determined gaze points and the corresponding stimulus object comprise a time delay in their respective time course, which also can vary.

The determination of the at least one calibration parameter of the at least one predefined calibration model can also be performed by above-named processing unit. For this purpose, the processing unit can analyze at least the position of at least part of the respective gaze points with regard to the defined trajectory of the stimulus object. But not only the positions of the determined gaze points can be used for calibration, but advantageously also other motion parameters, like a current velocity and/or a current moving direction and/or an acceleration or any other motion parameters of the respective determined gaze points. These additional motion parameters can correspondingly be analyzed with respect to corresponding motion parameters of the stimulus object. This allows for much better calibration results, because, as explained later in more detail, a better outlier detection can be provided, e.g. by applying correlation criteria between position and motion of the determined gaze points and position and motion of the displayed stimulus object.

In general, the calibration model can be a parameterized model of the eye. For example the eyeball can be modeled as sphere as well as also the cornea, wherein e.g. the cornea diameter and the eyeball diameter are parameters of the eye model, especially the at least one calibration parameter, which is determined on the basis of the calibration procedure. Also, by means of an eye tracking device only the optical axis of an eye can be determined, but the line of sight, which usually differs from the optical axis by a certain angle, cannot be measured directly. Also this certain angle can constitute the at least one calibration parameter of the parameterized eye model, which is determined according to the calibration procedure. Also the calibration model can be a parameterized correction model. Such a correction model defines a function, which, when the parameters have been determined in the calibration procedure, maps determined uncalibrated gaze points to the corresponding calibrated ones. Thereby one or more parameters of such a function, especially the at least one calibration parameter, is determined during the calibration procedure. After the calibration, when performing eye tracking with the calibrated eye tracking device, the eye tracking device determines gaze points of the user on the basis of a standardized eye model for an average human eye and the resulting determined gaze points are mapped by the defined function to the calibrated gaze points.

According to an advantageous embodiment of the invention the controlling of the execution of at least part of the calibration procedure in dependency of the at least one determined control parameter comprises controlling of the displaying of the stimulus object and/or controlling the determining of the at least one calibration parameter in dependency of the at least one determined control parameter.

As already mentioned above, it is very advantageous to adapt for example the displaying of the stimulus object to better comply with the capabilities of a certain user to follow the stimulus. On the other hand, also the way the at least one calibration parameter of the at least one predefined calibration model is determined, can advantageously be adapted in dependency of the control parameter. E.g. the model to be used for the calibration can be chosen in dependency of the quality and/or number of gaze samples. So advantageously an adaptive calibration model can be provided. Generally, the controlling can take place already during the displaying of the stimulus object and e.g. the displaying of the stimulus object can be controlled in dependency of the analysis of the gaze data captured so far. On the other hand, the controlling also can take place not until after the displaying of the stimulus object and the corresponding capturing of the images and determination of the gaze points is finished, namely when determining the at least one calibration parameter.

According to another advantageous embodiment of the invention the controlling of the displaying of the stimulus object comprises specifying and/or adapting the predefined trajectory and/or movement speed of the stimulus object and/or a look of the stimulus object, especially a size and/or form and/or color of the stimulus object. For example, if it is detected that the stimulus object is too fast, so that the user cannot follow the stimulus object with his eyes, the movement speed of the stimulus object can be reduced. On the other hand, if it is detected that the user is not sufficiently engaged in the calibration procedure, the attention of the user can be increased for example by increasing the velocity of the displayed stimulus object or by changing its color or form or look or size. Also the size of the stimulus object can be changed, e.g. enlarged, to be better visible for a user. Also the motion path can be changed or adapted, e.g. certain sections of the motion path can be repeated, if it is detected that no or only few suitable gaze points have been determined in a certain section or segment of the motion path. Therefore by controlling the displaying of the stimulus object, especially the way the stimulus object is displayed, in dependency of the at least one control parameter, it can be managed to facilitate the calibration procedure for a user to increase the intention attention of the user and finally improve the overall result of the calibration procedure.

According to another advantageous embodiment of the invention the controlling of the determining of the at least one calibration parameter comprises specifying the predefined calibration model by selecting the predefined calibration model from several predefined calibration models. Therefore advantageously also a suitable calibration model can be selected based on characteristics of the input data, namely the gaze data. Therefore also from the computational side the determination of the one or more calibration parameters can be improved and best possibly adapted to the available gaze data and the determined gaze points.

In particular, the several predefined calibration models differ from each other with regard to their degree of complexity and/or with regard to their order. The degree of complexity can for example be defined as the number of parameters, which the respective calibration model contains, and which are to be determined as the at least one calibration parameter. Moreover, the order of a calibration model can be defined e.g. as the power, analogously to the power or order of a polynomial. The more parameters a model has and/or the higher the order, also the more precisely the characteristic of the user or his eyes or the gaze characteristics can be modeled. However to achieve also stable results when using a model having plenty of parameters, also plenty of reliable gaze data, especially determined gaze points, are required. Therefore on the other hand, a simple model with only few or even only one single parameter, does not provide so much flexibility to adapt to the eye characteristics or gaze characteristics, however stable results can be achieved also in case only few gaze data or gaze points can be used for the calibration. Therefore advantageously also the selection of a suitable calibration model can be performed in dependency of the characteristics of the input data, namely the gaze data and the determined gaze points, like the number of gaze points that can be used for the calibration.

According to another advantageous embodiment of the invention for the determining the control parameter each of the previously determined gaze points is either classified as valid or invalid according to at least one predefined criterion. For getting accurate and reliable results, not only the number of determined gaze points is important. If a user is for example distracted and does not follow the stimulus object then the corresponding gaze points are not suitable for the calibration, because they have nothing to do with the shown stimulus position and moving path. So, according to this advantageous embodiment of the invention the gaze points can be classified to be suitable or not for the calibration and then e.g. only the suitable gaze points, namely the valid gaze points, can be used to perform the calibration, i.e. the determination of the at least one calibration parameter. To classify the determined gaze points as valid or invalid for example known outlier detection methods can be used, like RANSAC (RANdom Sample Consensus), or others. Furthermore, also predefined correlation criteria can be used to determine whether determined gaze points are correlated with the displayed stimulus object path or not. Therefore, gaze points which are determined to be outliers according to at least one outlier criterion and/or outlier detection method, and/or gaze points, which are determined to be not correlated with the shown stimulus path according to at least one correlation criteria, can be classified as invalid gaze points and can be discarded or at least not be used for determining the at least one calibration parameter. The other determined gaze points can correspondingly be classified as valid gaze points. For determining, whether the determined gaze points are correlated with the shown stimulus path or not, additionally to the positions of the determined gaze points and the corresponding positions of the displayed stimulus object over time also motion parameters, like velocity, moving direction and/or acceleration of the respective determined gaze points as well as those of the corresponding stimulus object at corresponding times can be used as already mentioned above.

According to another advantageous embodiment of the invention the at least one control parameter defines a capability of the user to follow the displayed stimulus object, wherein the capability is evaluated in dependency of the number of valid gaze points, especially in comparison to the number of invalid gaze points. This is a particular advantageous embodiment of the invention, because the classification of the determined gaze points as valid or invalid cannot only be used to perform the calibration of the at least one calibration parameter on the basis of the valid gaze points, but also for judging whether the execution of the calibration procedure, especially of the displaying of the stimulus object, should be adapted or not in order to enhance the capability of the user to follow the displayed stimulus object. Especially by comparing the number of valid gaze points with e.g. an empirical standard value or to the number of invalid gaze points or to the total number of determined gaze points, it is possible to quantify the capability of the user to follow the displayed stimulus object, which then can advantageously be used to adapt the calibration procedure correspondingly to achieve better results. Also, the user's performance can be evaluated, especially in dependency of above described determined capability of the user to follow the stimulus object, and therefrom for example an expected calibration accuracy level or quality value can be estimated. Such a quality value can also be determined by procedures described further below.

Moreover, according to another embodiment of the invention, the predefined trajectory is divided in several segments, wherein the capability of the user to follow the stimulus object is evaluated for each segment respectively. This has the great advantage that for example for a first segment it can be determined, whether the user is capable of following the stimulus object or not or how good or how bad. If it is determined, that the capability of the user to follow the stimulus object is for example below a predefined threshold, for the next segment of the trajectory the displaying of the stimulus object can be adapted, and then for the second segment again it can be determined whether the capability of the user to follow the stimulus object has improved, and so on. This advantageously allows for a closed loop control of the displaying of the stimulus object in dependency of the defined capability of the user to follow the stimulus object, segment by segment. Furthermore, the separation of the trajectory in several segments also has the advantage, that it can be determined for which segments the capability of the user to follow the stimulus object is good and for which segments it is bad. Then the displaying of the stimulus object in regions with segments, for which the capability of the user to follow the stimulus object was too low, can be repeated. The capability of the user, either with respect to the whole trajectory of the shown stimulus object, or also with regard to single segments of the trajectory, can further be used for selecting the predefined model, which is explained later in more detail.

Furthermore, according to another advantageous embodiment of the invention, the displaying of the stimulus object is controlled in dependency of the evaluated capability of the user to follow the displayed, especially such that
  if the capability with regard to a segment is lower than a predefined threshold, the stimulus object is displayed with changed velocity in the next segment of the trajectory; and/or
  if the capability with regard to a certain segment of the trajectory in an associated certain part of the display is lower than a predefined threshold, the displaying of the stimulus object is repeated in that certain part of the display area in one of a following segment of the trajectory; and/or
  if the capability with regard to a segment is lower than a predefined threshold, the stimulus object is displayed with a different look in the next segment of the trajectory.

Above named predefined thresholds can be the same but also can be defined differently. So for example if the velocity of the displayed stimulus object is reduced, it may be easier for a user to follow the displayed stimulus object and the results can be improved. On the other hand, the velocity of the stimulus object can also be increased to increase the attention of the user, e.g. if the user was not paying attention due to being bored. Whether the velocity is increased or reduced can depend on further factors. For example, if the velocity is already low and the capability is determined to be low as well, namely beyond a predefined threshold, then probably the user is not paying attention and the velocity preferably is increased instead of reduced further. If the velocity is already high and the capability of the user is below the threshold, then the velocity of the stimulus object preferably is reduced. Also it can be determined whether a low capability of the user to follow the object is due to the fact that the user is distracted or is due to the fact that the velocity is too high for the user's eyes. This can for example also be determined on the basis of the already captured gaze data or an analysis of the determined gaze points. If for example the determined gaze points over time follow the displayed stimulus object, but comprise a large scattering or the time delay between the shown stimulus object and the corresponding gaze points is quite large, this is probably is due to the incapability of the user to follow the stimulus though he/she is trying to, whereas if the determined gaze points lie far away from the shown stimulus object and comprise a movement characteristic, which is not correlated with the movement of the stimulus object at all, this is probably due to the fact that the user is not paying attention to the displayed stimulus object. Therefore also these gaze characteristics can be considered for deciding whether the velocity is increased or reduced, in case the determined capability is beyond a threshold. So advantageously, the method is able to interactively react on user's performance in following of the stimulus with the gaze by adapting the process, namely the execution of the calibration procedure, to achieve the best result.

Furthermore, to attract more attention of the user in case the capability is beyond the threshold, the stimulus object advantageously can also be displayed with a different or varying color or with a different or varying size or in general with a different or varying look to attract attention. Also it's very advantageous to repeat the displaying of the stimulus object in certain parts of the display area, for which the determined capability was too low. Therefore good gaze data can be provided over the whole display area.

According to another advantageous embodiment of the invention the predefined model is selected in dependency of the number of valid gaze points and/or of the evaluated capability of the user to follow the displayed stimulus, especially with respect to the total trajectory. As already mentioned, models with high complexity or high order also require a large number of valid gaze points to provide stable results. So if enough gaze data are provided, especially if enough valid gaze points have been determined, e.g. more than a threshold, then advantageously a model with higher complexity can be selected for the calibration, and so the calibration provides a higher accuracy. On the other hand, if the number of valid gaze points is quite low, then a model with lower complexity can be selected to provide more stable and robust results. So advantageously, a calibration model from the several calibration models of different levels of complexity can be automatically selected based on characteristics of the input data.

According to another advantageous embodiment of the invention each of the several predefined models is associated with a certain quality value, and further each model is associated with at least one minimum value, which specifies
  a required minimum number of valid gaze points and/or
  a required minimum total size of parts of the display area, over which the spatial distribution of segments, for which the number of valid gaze points and/or the evaluated capability of the user is higher than a predefined threshold, extends and/or a required minimum number of, in particular equally sized, subareas of the display area, which are associated with corresponding parts of the trajectory, for which the number of valid gaze points and/or the evaluated capability of the user is higher than a predefined threshold.

For example the expected calibration accuracy level or quality value can be defined by the final complexity level, especially the associated certain quality value, of the calibration model used for the calibration. So the certain quality value assigned to each of the predefined models can be assigned according to the level of complexity or order associated with each model. So the higher the complexity and/or order of the model is, the higher is the quality value associated with a model or assigned to the model. As already mentioned, a complex model only leads to stable results if enough useful gaze data, namely valid gaze points, can be used to calibrate the model to determine the model parameters. So according to this advantageous embodiment of the invention, each of the several predefined models can be associated with such a required minimum number of valid gaze points. Consequently such a model is only selected to be the predefined model according to which the calibration procedure is performed for determining the at least one calibration parameter if the number of valid gaze points is above the required minimum number or even both required minimum numbers defined above for that specific model. Further, it's very advantageous to assign to each model a required minimum total size of parts of the display area, over which the spatial distribution of segments, for which the number of valid gaze points and/or the evaluated capability of the user is higher than a predefined threshold, extends and/or a required minimum number of subareas of the display area, which are associated with corresponding parts of the trajectory, for which the number of valid gaze points and/or the evaluated capability of the user is higher than a predefined threshold. In other words, it is better if in a large area of the display area valid and suitable or high quality gaze points can be captured. If for example according to the validity criterion it is determined that only gaze points in the left corner on the bottom of the screen comprise a high quality, but gaze points in all other areas of the screen have been classified as being invalid, then even if the number of valid gaze points would be high enough to choose a certain model with high complexity, then this model would only be able to accurately calibrate gaze points for the left bottom corner of the screen, and it can happen that in subsequent eye tracking applications using these calibration results when the user looks in other parts of the screen the gaze points are not correctly determined, because the calibration is not valid or accurate for other parts of the screen. But when selecting a model with low complexity instead in such a case, stable and robust results can be achieved also for other parts of the screen. Therefore, it is advantageous to have such selection requirement for selecting a certain predefined model that a certain spatial distribution of high-quality segments needs to be present. If not, then a model with lower complexity or order is selected satisfying these criteria and is used for the calibration, in which the calibration parameters of the selected model are determined.

According to another advantageous embodiment of the invention the predefined model is selected in dependency of a set minimum quality value, especially prior to displaying the stimulus object. This set minimum quality value can for example be set or be selected manually by a user, who wants to achieve this certain minimum quality for the calibration. Also this minimum quality value can be requested by a certain application, for which eye tracking is used to control this application. Some eye tracking applications may need a very high tracking accuracy and therefore can communicate the required minimum quality value to the processing unit of the eye tracking system, which then correspondingly sets this minimum quality value and selects the predefined model correspondingly. Furthermore, the displaying of the stimulus object is then controlled such that the stimulus object is displayed until the required minimum number of valid gaze points and/or the required minimum total size and/or the required minimum number of the subareas of the display area associated with the selected predefined model is reached. Or in other words, displaying of the stimulus object is performed until the requirements for the selected model for achieving the set quality value are satisfied.

Therefore, advantageously the calibration procedure, especially the execution of the calibration procedure, can be controlled such that a required minimum quality value for the calibration is achieved. Generally, for performing the calibration procedure different constraints can be set in advance, like above described set minimum quality value. And then the execution of the calibration is performed such that the set minimum quality value is reached. However, also other constraints can be set in advance, like a time constraint. Correspondingly, the execution of the calibration can be controlled such that the best possible quality is achieved within a preset time limit defined by the time constraint.

Thus, according to another advantageous embodiment of the invention for performing the calibration procedure a mode out of at least two modes comprising a first mode and a second mode can be selected, wherein in the first mode a maximum duration for the calibration procedure is settable and the displaying of the stimulus object and the capturing of the images of the at least one eye are performed only for a certain period of time, which is the set maximum duration, and wherein in the second mode a minimum quality value is settable and the displaying of the stimulus object and the capturing of the images of the at least one eye are performed until a required minimum number of valid gaze points and/or
a required minimum total size of parts of the display area, over which the spatial distribution of segments, for which the number of valid gaze points and/or the evaluated capability of the user is higher than a predefined threshold, extends and/or a required minimum number of, in particular equally sized, subareas of the display area, which are associated with corresponding parts of the trajectory, for which the number of valid gaze points and/or the evaluated capability of the user is higher than a predefined threshold, associated with the set minimum quality is reached or a user input for stopping the displaying is received.

So advantageously on the one hand a time limit can be set for the performance of the calibration procedure according to the first mode. In this first mode then the stimulus object is displayed until the time limit is reached. Afterwards, the captured gaze data and the determined gaze points are analyzed and depending on the number of valid gaze points and/or the determined capability of the user to follow the shown stimulus object, the calibration model can be selected, for which the above described minimum requirements are satisfied. Therefore this method according to the first mode allows for the highest possible quality within the set time limit. In the second mode, instead the minimum quality can be set, and an according calibration model can be chosen, the associated quality value of which is equal or above the set minimum quality value, and after that the stimulus object is shown until the requirements associated with the selected model are satisfied.

Consequently, according to the second mode a quality based process is executed and according to the first mode a time-based process is executed. In the quality based process a minimum target quality level that needs to be reached is set. In this case the method starts with a predefined motion path and determines user engagement and capability to follow the current stimulus. It also dynamically assesses, if a sufficient number of samples of sufficient quality in coverage of the user field of view, namely above described minimum total size of the spatial distribution of segments, has been collected and if this is sufficient to apply the predefined calibration or correction model, which has been chosen to achieve the target quality. Once the quality criteria have been met, the stimulus animation is concluded and the parameters of the correction model are being computed. As long as the quality criteria have not been met, the calibration continues the motion of the calibration stimulus, possibly varying its path position, direction, velocity, size and appearance, for example changing the displayed stimulus image, to stimulate user engagement or to facilitate the visual tracking of said stimulus in case it is determined that the motion is too fast or too slow for the user. The calibration can also end based on explicit user input, for example the user presses a key to indicate that the calibration must be interrupted. In that case the calibration will use all the samples and information collected up to the interruption point and behave as in the time-based process.

According to the time-based process, a maximum calibration time is set. This might be necessary in some situations where the calibration has to be concluded very quickly, for example because the user might become very tired, or to reduce the total time to perform an eye tracking experiment. In this case according to the method a motion path is determined based on the planned calibration duration trying to achieve a maximum coverage of the user's field of view (or display size) within the time and a maximum velocity constraint. During the stimulus display and motion, the stimulus velocity may be adapted based on the determined capability of the user to follow the path. At the end it is assessed the number of samples of sufficient quality in coverage of the user field of view, which have been collected during the calibration time, and a correction model is adaptively selected depending on number and distribution of said "good" samples, namely the number of valid gaze points and/or number of gaze points for which the capability of the user to follow the stimulus object has been rated to be higher than a certain threshold. For few samples or limited field of view coverage, a low order/complexity calibration model will be adopted. For many samples and extensive coverage of the field of view of the user, a higher order calibration model or calibration model with higher complexity may be adopted.

According to another advantageous embodiment of the invention the stimulus object is displayed such that the stimulus object is at least temporarily static. The invention or its embodiments on the one hand use motion as a feature to the determine user engagement. This advantageous embodiment on the other hand makes it possible also to detect and use fixations present in the gaze data, like when the stimulus motion is paused for some time window in between motion. The use of gaze data relating to fixations is very advantageous, as further information can be derived, for example the average scattering or spread of gaze points. In general, the system can also be configured to detect fixations though the stimulus object is not static, for example if the user at times is fixating his gaze due to distraction. Gaze points associated with such a fixation then can be easily determined as being outliers.

The invention also relates to an eye tracking system for performing a calibration procedure for calibrating an eye tracking device of the eye tracking system. The eye tracking system comprises a display device, which is configured to display an at least temporarily moving stimulus object, which is moving along a defined trajectory. The eye tracking device also comprises an imaging device, which is configured to capture images of at least one eye of at least one user during the stimulus object is displayed by the display device. Further the eye tracking device comprises a processing unit, which is configured to determine positions of respective gaze points of the at least one eye of the user based on the captured images. Moreover, the processing unit is configured to determine at least one calibration parameter of at least one predefined calibration model in dependency of an analysis of the determined positions of the respective gaze points with regard to the predefined trajectory of the stimulus object. Moreover, the processing unit is configured to determine at least one control parameter in dependency of at least part of the gaze data and to control the execution of at least part of the calibration procedure in dependency of the at least one determined control parameter.

The advantages described with regard to the method according to the invention and its embodiments correspondingly apply to the system according to the invention. Moreover, the features and preferred embodiments described with regard to the method according to the invention constitute further preferred embodiments of the system according to the invention.

Generally, the system comprises an eye tracking device and a processing unit, which may or may not be included within the eye tracking device, and which controls the stimulus and performs all the necessary computations for the calibration. Further, the system comprises means to show the calibration stimulus to a user in form of the display device, which can be implemented for example through a monitor screen or a head mounted display or a virtual reality headset, etc.

In particular, the system can be implemented as a head mounted system comprising the eye tracking device, which comprises one or more cameras, which are integrated in the head mounted system. This can be for example in the form of glasses, or a helmet, or any other fixture on a user's head. Also the display device is included in said glasses or helmet or other head mounted device. Furthermore the display device might be monocular or is preferably binocular, and which is used to show the calibration stimulus object to the user. Finally, the processing unit, for example a (low power) CPU or a FPGA or dedicated ASIC, might be included inside the device's frame, or it might be external to it, for example connected through a cable, or through a wireless connection. Typical examples of this embodiment could be action camera glasses or helmets, eye tracking glasses or helmets, augmented reality glasses or helmets, virtual reality glasses or helmets, etc.

According to another embodiment of the invention the eye tracking system is configured as a remote system. According to this embodiment the display and the eye tracker are not fixed to the user's head, although the user is able to see the display, and the eye tracker is able to see the user, especially by means of the imaging device, that may comprise at least one camera. For example, the display is a computer monitor, or a tablet or laptop, or a television set, or an advertising panel, etc. The eye tracker is mounted in the proximity of said display. The processing unit might be a CPU included in a PC or laptop or tablet or smartphone connected, by cable or wirelessly, to the display and the eye tracker, or it might be part of the eye tracker itself.

According to another embodiment of the eye tracking system can also be configured as a mixed system, wherein the eye tracker might be head mounted while the display is not, for example a user is wearing eye tracking glasses, and the display, which is used, is a PC monitor. Another possible embodiment includes a head mounted display, but and external eye tracker, which might be positioned for example on a desk or on a dedicated holder. The processing unit can be integrated in either the system, or be standalone, and be able to communicate with the display and eye tracking system by cable or wirelessly.

Further features of the invention and advantages thereof derive from the claims, the figures, and the description of the figures. All features and feature combinations previously mentioned in the description as well as the features and feature combinations mentioned further along in the description of the figures and/or shown solely in the figures are not only usable in the combination indicated in each place but also in different combinations or on their own. The invention is now explained in more detail with reference to individual preferred embodiments and with reference to the attached drawings.

Figure 2:
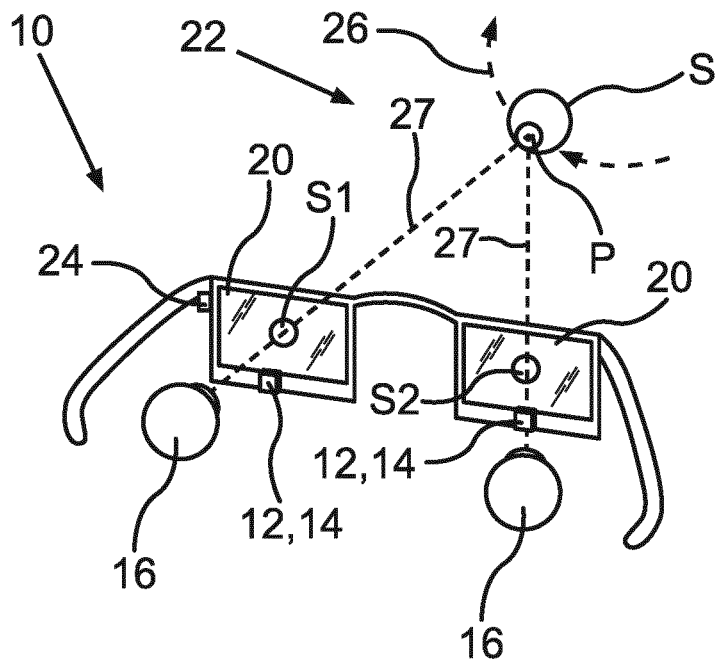
Figure 3:
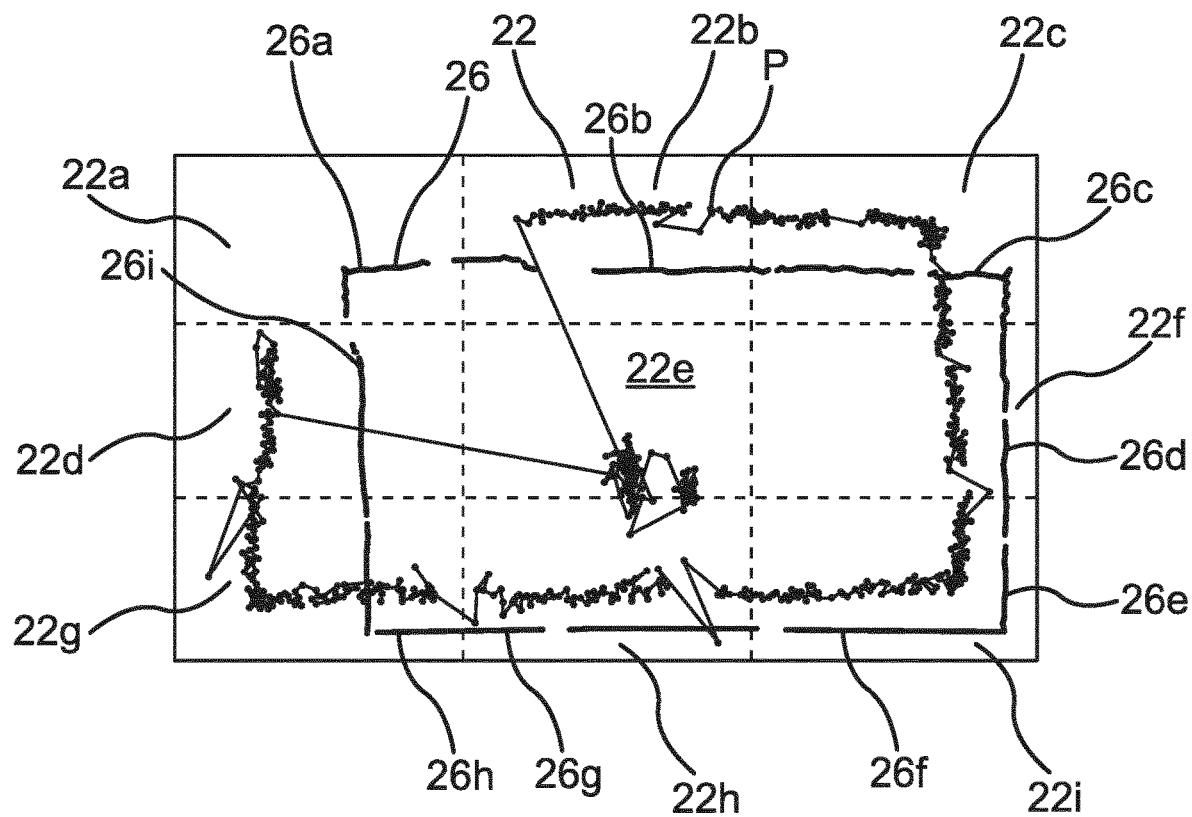
Figure 4:
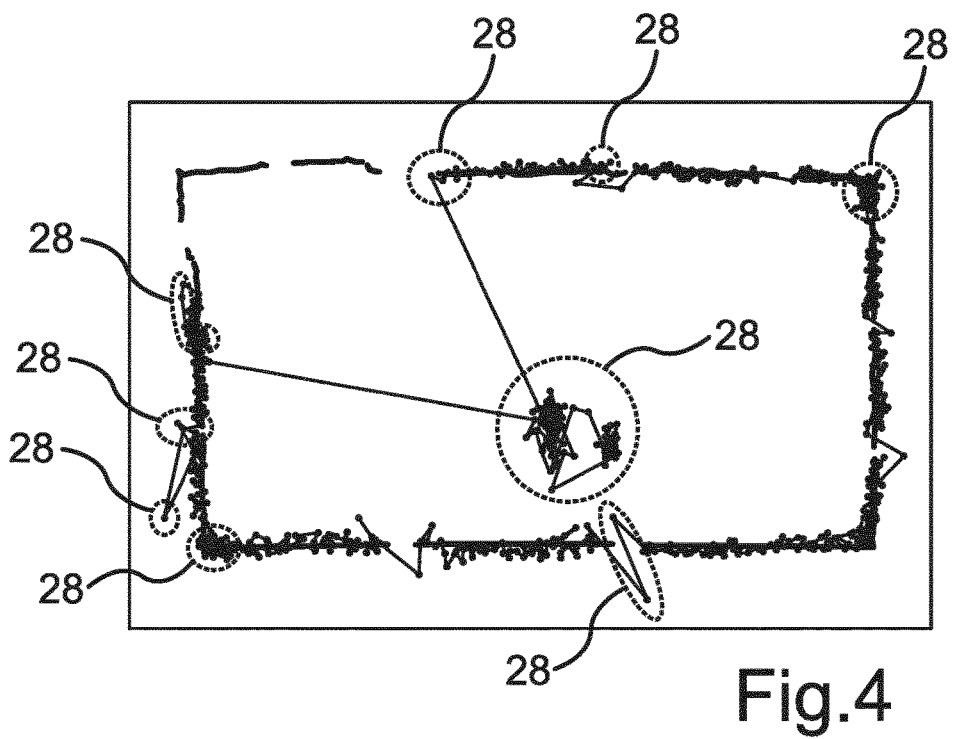
Figure 6:
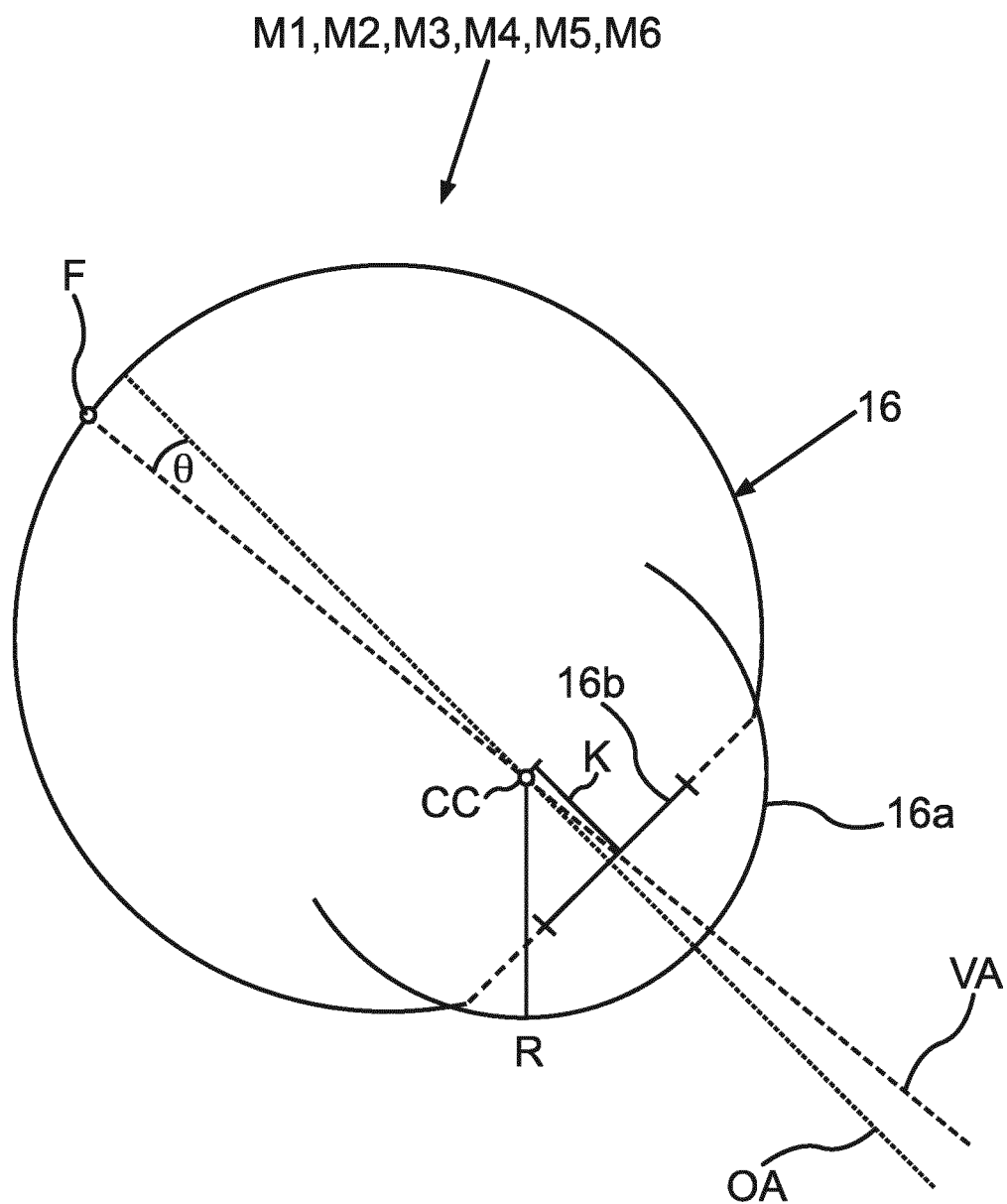
Figure 7:
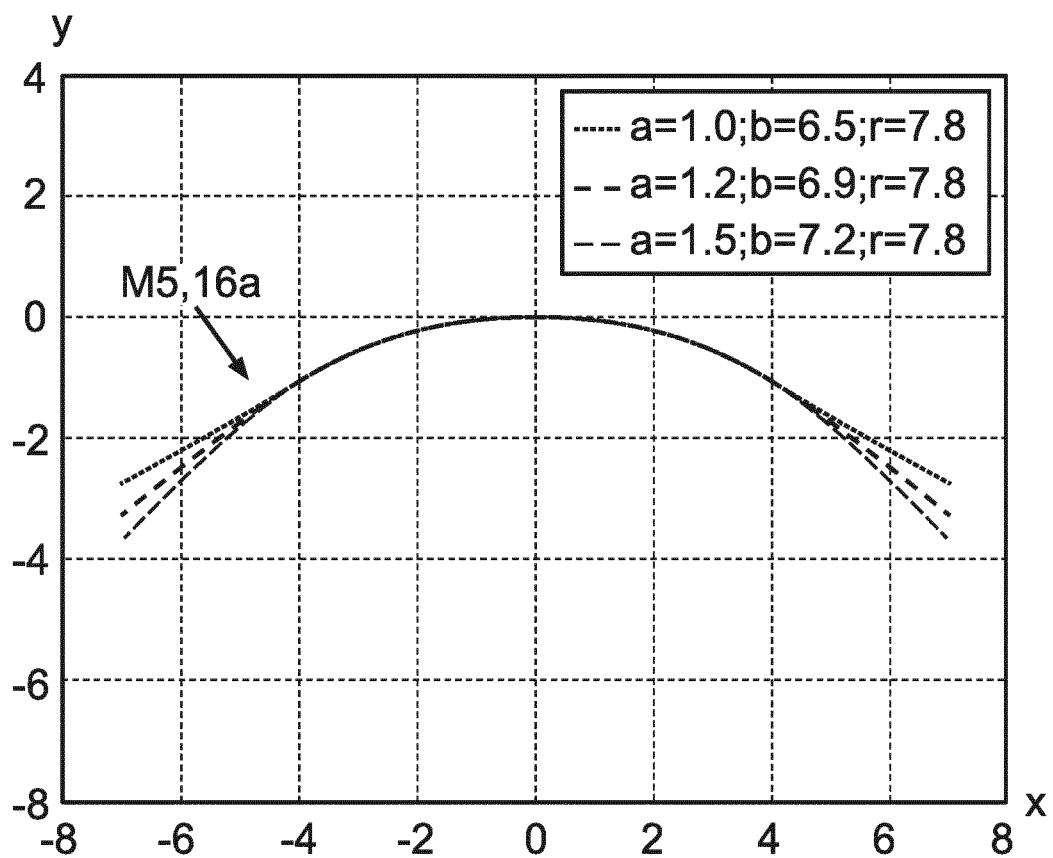
Figure 8:
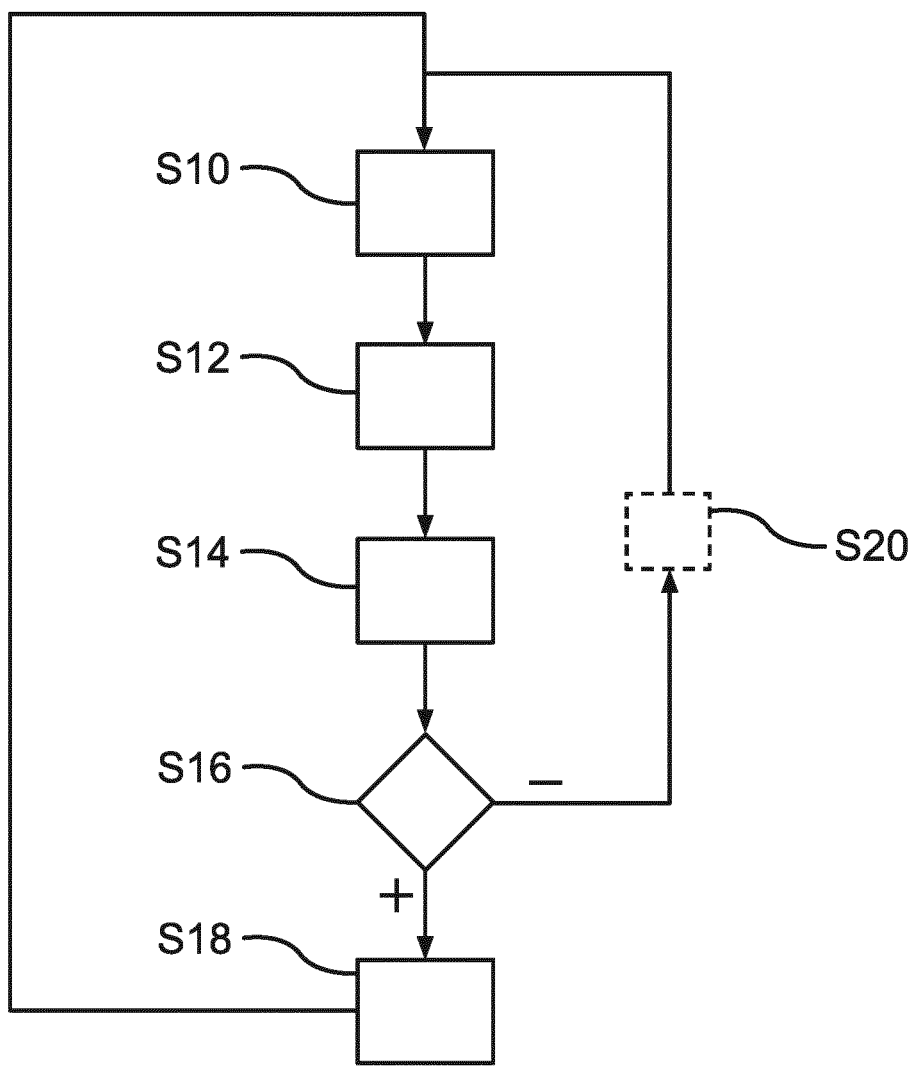

Therein show:

FIG. 1 a schematic illustration of an eye tracking system, which is configured as a remote system according to a first embodiment of the invention;

FIG. 2 a schematic illustration of an eye tracking system, which is configured as a head mounted system according to a second embodiment of the invention;

FIG. 3 a schematic illustration of the trajectory of a shown stimulus object and corresponding uncalibrated gaze points within a display area over time;

FIG. 4 a schematic illustration of the trajectory of a shown stimulus object and corresponding calibrated gaze points within the display area over time;

FIG. 5 a table for illustrating the selection of one of different calibration models in dependency of a control parameter according to an embodiment of the invention;

FIG. 6 a schematic illustration of eye models for use as calibration models according to an embodiment of the invention;

FIG. 7 a schematic illustration of a cornea model for use as a calibration model for different calibration parameters according to an embodiment of the invention; and FIG. 8 a flowchart to illustrate a method to control the displaying of the stimulus object in dependency of a control parameter according to another embodiment of the invention.

The method and eye tracking system according to the invention and its embodiments, as explained in more detail with regard to the drawings in the following, generally lie in the field of eye tracking core technology, user calibration, human computer interaction and eye tracking systems, all which require a calibration, including but not limited to the formats of remote and monitor mounted, tower and chinrest based, head mounted glasses, sport action cameras, virtual reality systems, augmented reality systems, and head mounted devices.

FIG. 1 shows a schematic illustration of an eye tracking system 10, which is configured as a remote system according to a first embodiment of the invention. The eye tracking system 10 comprises an eye tracking device 12, which comprises an imaging device which is configured as at least one camera 14 and capable of capturing images of at least one eye 16 of a user 18. Moreover, the eye tracking system 10 comprises a display device 20, which is configured as a monitor, and which provides in this example a 2D display area 22. Furthermore, the eye tracking system 10 comprises a processing unit 24, which can be integrated into the display device 20, or integrated into the eye tracker 12, or also be configured as a separate entity as a standalone processing unit 24 and be communicatively coupled to the display device 20 to control the display device 20 and to the eye tracker 12 to analyse the captured images, to therefrom derive gaze data and on the basis of the derived gaze data determined gaze points of the user 18 with respect to the display area 22. The processing unit 24 also is configured to perform the calibration procedure explained later in more detail.

For performing a calibration procedure of the eye tracking device 12, the processing unit 24 is configured to control the display device 20 to display a stimulus object S within the display area 22, such that the stimulus object S is at least temporarily moving along defined trajectory 26. Furthermore, the processing unit 24 controls the eye tracking 12 during the calibration procedure such, that the camera 14 captures images of the eyes 16 of the user 18 during the displaying of the stimulus object S. Moreover, the processing unit 24 is configured to provide gaze data based on the captured images and in dependency of the gaze data to determine gaze points of the at least one eye 16 of the user 18 with respect to the display area 22. Especially, based on the captured images, the gaze direction 27 of the user 18 can be determined with respect to one single eye 16 or both eyes 16 in average. The determined gaze direction 27 can then be intersected with the display area 22 to get the resulting gaze point, which is here denoted by P.

These calculations can be performed with respect to a defined coordinate system, preferably a coordinate system, which is fixed with regard to the eye tracker 12 and/or the display device 20. Moreover, the position of the camera 14 as well as the positions of the shown stimulus image S in its temporal course defined by the trajectory 26, as well as position and orientation of the display area 22 in general are known to the processing unit 24 and used for the calculations.

However, for the calibration preferably not only the position of the gaze points P and the stimulus object S are used, but also motion parameters, like velocity, acceleration, moving direction, and so on. In general, the calibration uses as input stimulus, gaze and head position vectors as well as corresponding time stamps.

Usually, the uncalibrated gaze point P does not coincide in its position with the position of the shown stimulus object S. To enhance the accuracy of the determination of the gaze point P, the eye tracking device 12 needs to be calibrated. For this purpose a calibration model is used, which comprises at least one calibration parameter, which is determined on the basis of the determined gaze points, especially their positions and motion parameters, met with regard to the defined trajectory 26 of the stimulus object S.

FIG. 2 shows a schematic illustration of another example of an eye tracking system 10, which is configured as a head mounted system according to an embodiment of the invention. Especially the eye tracking system 10 is implemented in form of augmented reality or virtual reality glasses. The eye tracking system 10 also comprises a display device 20, which is configured as a binocular display in form of one display for the left eye 16 and one display for the right eyes 16. This head mounted eye tracking system 10 also comprises an eye tracking device 12, which comprises two eye cameras 14, one for the left eye 16 and one for the right eye 16. Furthermore, the head mounted eye tracking system 10 also comprises an integrated processing unit 24. The display device 20 again is configured to display an at least temporarily moving stimulus object S within a display area 22, which in this case is a three-dimensional display area 22 that does not coincide with the display surface as of the respective displays 20. This stimulus object S here constitutes a virtual stimulus object S, which is provided by displaying respective stimulus images S1, S2 on the respective display surfaces of the displays 20, which are perceived by the user 18 as the virtual stimulus object S in the 3D display area 22, moving at least temporarily along the defined 3D trajectory 26. Apart from that, the eye tracking system 10 and its components are configured as already explained with regard to FIG. 1.

Embodiments of the calibration of the eye tracking device 12 are now explained in more detail. FIG. 3 shows a schematic illustration of the positions of the stimulus object S, constituting the trajectory 26, as well as the determined uncalibrated gaze points P over time with respect to the display area 22. For the sake of clarity, here only one gaze point P is shown with a reference sign. As can be seen, the position of the temporal course of the uncalibrated gaze points P deviates in average from the trajectory 26, on which the stimulus object S has been displayed. In this illustration this deviation almost is a constant positional offset with respect to the trajectory 26, but in general can be more complex as well. So during the calibration, one or more calibration parameters of a predefined calibration model are calculated such that then the deviations of the respective gaze points P with respect to the trajectory 26 is minimized in average.

Now the determination of the calibration parameter is explained according to an embodiment of the invention. First of all, the calibration model can be an adaptive calibration model, meaning that several different predefined calibration models M, M1, M2, M3, M4, M5, M6 (compare FIG. 5 and FIG. 6) can be defined, which differ from each other with regard to their complexity and/or order.

FIG. 5 shows a schematic illustration of examples of such different models M in a table. These calibration models M map the positions of uncalibrated gaze points P, the positional coordinates of which are denoted by x and y, to corresponding positions of respective calibrated gaze points P' (compare FIG. 4). The positional coordinates of the calibrated gaze points P' are denoted here as x', y'. Moreover, these models M comprise calibration parameters a1, a2, a3, a4, a5, a6, a7, a8, a9, a10, a11, a12, a13, a14. But not only positions of the uncalibrated gaze points P can be considered in these models M, but also for example motion parameters like the velocities of gaze points P in different directions, which are here denoted by $v_x$, $v_y$. The complexity C of the respective models M can be defined by the number of calibration parameters they contain. Moreover, order O of the respective models M can be defined analogously to the order O or power of a polynomial. So for example models M containing terms like "$x^2$", "$y^2$" or "$xy$" are of second order O.

Models M with higher complexity C and/or order O can be more accurately adapted to certain gaze characteristics of a user and therefore, as a rule of thumb, can provide a more accurate calibration. Correspondingly, each model M can be associated with a quality value Q, representing the achievable accuracy level when using this model M. In this example the quality values Q can simply be 1, 2, 3, 4, 5, 6, and 8. So, the higher the complexity C and/or order O of the respective model M, the higher the corresponding quality value Q. However models M with a high complexity C and/or order O tend to be more sensitive to outliers and noise in the data and require lots of input data to achieve robust and stable results. If for example only few suitable gaze points P have been determined, it is preferred to select a model M with lower complexity C or order O in order to achieve more stable results, even if this may reduce accuracy.

In an alternative calibration scheme, the calibration models M represent different levels of geometrical models M1, M2, M3, M4, M5, M6 of the eye 16, with an increasing number of parameters and complexity as illustrated in FIG. 6.

So for example, the lowest order calibration model M1 could calibrate just an angular offset($\theta$, $\varphi$) between the visual axis VA and the optical axis OA of the eye 16, which can be represented by two angular components ($\theta,\varphi$) of which only $\theta$ is illustrated in FIG. 6. Both, the visual axis VA and the optical axis OA pass through the center CC of the cornea 16a. The optical axis OA additionally passes through the center of the pupil 16b, whereas the visual axis VA passes through the center of the fovea F.

A second order calibration model M2 could additionally calibrate the outer radius R of curvature of the cornea 16a, assumed to be spherical; a third order calibration model M3 could additionally calibrate a distance K between the center of the pupil 16b and the center CC of curvature of the cornea 16a; a fourth order calibration model M4 could additionally calibrate a Keratometric index of refraction ($n_1$) of the cornea 16a and aqueous humor; a fifth order calibration model M5 could additionally calibrate a flattening model of the surface of the cornea 16a in dependency from the radial distance to the optical axis OA, for example using a Sum of Sphere and Exponential (SSE) model $$z = -r + \sqrt{r^2 - x^2 - y^2} + e^{\left(a*\sqrt{x^2+y^2}\, -b\right)} - e^{-a*b}$$

with calibration parameters a, b and r, which is illustrated in more detail in FIG. 7. Therein FIG. 7 shows a schematic illustration of above described SSE Model M5 of the cornea 16a, especially for three different combination of the model parameters a, b, r, which constitute calibration parameters.

A sixth order calibration model M6 could additionally calibrate an astigmatism prescription (cylinder and axis); and additional higher order models can parameterize an irregular shape of the cornea shape.

The selection of the model M, M1, M2, M3, M4, M5, M6 can be performed in dependency of one or more control parameters, which are derived from the captured gaze data. An example of such a control parameter is the total number N of valid gaze points P as shown in FIG. 5. For this purpose, the determined gaze points P can be classified as valid or invalid according to a certain predefined criteria. For example outliers can be detected using consensus based (or "voting") algorithms such as RANSAC, or using robust regression methods, for example Iteratively Reweighted Least Squares (IRLS). Also correlation criteria can be used to check whether determined gaze points P are, based on their positions and motion parameters, correlated with the motion path 26 of the displayed stimulus object S. The gaze points P, which do not satisfy the validity criteria are exemplarily shown in FIG. 4 in the marked areas 28. Especially FIG. 4 shows the calibration results, which is explained later in more detail.

So for example the larger the number N of valid gaze points P, the higher can be the complexity C and/or order O of the model M, which is selected for the calibration. But not only the total number N of valid gaze points P can be considered as control parameter for selecting a corresponding model M, but also for example the spatial distribution of the valid gaze points P with respect to the display area 22. For this purpose, the display area, as illustrated in FIG. 3, can be divided into several subareas 22a, 22b, 22c, 22d, 22e, 22f, 22g, 22h, 22i. In this example nine subareas 22a, 22b, 22c, 22d, 22e, 22f, 22g, 22h, 22i are presented. Furthermore, in this example seven of the nine subareas 22a, 22b, 22c, 22d, 22e, 22f, 22g, 22h, 22i comprise a sufficient number of valid gaze points P, which are in the following also called valid subareas 22b, 22c, 22d, 22f, 22g, 22h, 22i. The number of valid subareas 22b, 22c, 22d, 22f, 22g, 22h, 22i or the relative number of valid subareas 22b, 22c, 22d, 22f, 22g, 22h, 22i with respect to the total number of subareas 22a, 22b, 22c, 22d, 22e, 22f, 22g, 22h, 22i can constitute another control parameter as illustrated in FIG. 5, wherein A represents the number of subareas 22a, 22b, 22c, 22d, 22e, 22f, 22g, 22h, 22i of the display area 22 with sufficient valid gaze points P. But preferably not only the number A of valid subareas 22b, 22c, 22d, 22f, 22g, 22h, 22i as such is taken into account for selecting a suitable model M, but also the spatial distribution D of these subareas 22b, 22c, 22d, 22f, 22g, 22h, 22i with respect to the whole display area 22, so that also each Model M can be further associated with a respective distribution D1, D2, D3, D4, D5, D6, D7, D8, or especially associated with respective tuples of numbers A1, A2, A3, A4, A5, A6, A7, A8 of valid subareas with respect to certain distributions D1, D2, D3, D4, D5, D6, D7, D8.

So in general the order O and/or complexity C of the model M can be determined on the basis of the number N of valid gaze points P, on their spatial distribution (A, D) or on a combination of both.

Furthermore, also the capability of the user to follow the displayed stimulus object S can be calculated on the basis of the number of valid gaze points P, especially with respect to the total number of gaze points P or with respect to the number of invalid gaze points P. Therefore lots of information can be derived from the input data, namely the captured gaze data, which make it possible to adapt the calibration procedure in an optimal way.

Furthermore, to provide more detailed calculations and considerations, the trajectory 26 as well as the gaze points P can be separated in single segments 26a, 26b, 26c, 26d, 26e, 26f, 26g, 26h, 26i, which is also illustrated in FIG. 3. Especially in FIG. 3 the trajectory 26 of the stimulus object S is separated in respective segments 26a, 26b, 26c, 26d, 26e, 26f, 26g, 26h, 26i.

The separation into segments 26a, 26b, 26c, 26d, 26e, 26f, 26g, 26h, 26i allows for further embodiments, one of which is described in the following:

The method can be implemented by a corresponding algorithm, especially a motion-based calibration algorithm, which is now described. As input the algorithm uses stimulus, gaze and head position vectors as well time stamps. The processing executed by the processing unit 24 comprises the following steps:

1. A data matrix A describing interaction of the user with the stimulus object is created. Such matrix typically contains time stamps, stimulus information (position, velocity) and gaze information (position, velocity, head orientation, CR, pupil measures and other data). The matrix is sorted by the time stamps.
2. In order to provide a near real-time feedback the data are split into segments. The splitting can be performed in sequential chunks or using a running window splitting. For each segment measures aggregated over all data points in the segment are calculated. These measures among others include mean and variance of the input vectors, energy, collinearity of the stimulus and gaze movements. These aggregated measures are added to the data matrix A.
3. For each data segment the data matrix A is used to classify the gaze data into following classes:
   Class 1: User is fixating on a stationary stimulus.
   Class 2: User is following a moving stimulus with gaze.
   Class 3: User is not paying attention to the stimulus.

Due to large variety of the physical ability of users to follow a moving stimulus (class 2 data) the gaze can represent smooth pursuit, catch-up saccades, look aheads or series of short fixations. This behaviour can be modelled in parametric form representing a set non-uniform gaze movements or extracted from the data matrix A using other statistical methods.

The classification of the data into classes 1, 2 and 3 can be performed either using Machine Learning techniques or a rule-based approach or a mixture of both. As a result, the algorithm provides near real-time information about user's behaviour: if the stimulus is being followed by the gaze or not.

4. For each data segment a probability measure is calculated that estimates a likelihood of a gaze point belonging to a given class. Gaze data that belong to the class 1 or class 2 with the probability above a defined threshold will be processed further in the following steps.
5. Select model M that describes the user following the stimulus in order to derive calibration coefficients. The model selection process needs to take into account amount of the data, its spatial distribution as well as the level of noise. In order to avoid overfitting regularization is introduced in addition to the noise detection techniques. The process can be described in the following steps:
   a. Select data from the data matrix A that belong to the class 1 or 2 with the probability above defined threshold.
   b. Take model M with the highest complexity.
   c. Identify outliers according to the selected model M. For example, RANSAC algorithm, consensus based algorithm or robust regression can be used for this purpose.
   d. Check if the result satisfies the regularization criteria,
   e. Else downgrade the complexity of the model M and repeat steps c) and
   d).
6. For the data belonging to the classes 1 and 2 with outliers being removed apply regression fit using model M selected by the step 5.

A particularly advantageous embodiment of such algorithm is as follows:

1. Preparing an array of matched in time stimulus, gaze and head position vectors.
2. Going to the normalized eye-based coordinate system.
3. Creating an array of gaze points with a smoothing filter applied.
4. Splitting data into segments 26a, 26b, 26c, 26d, 26e, 26f, 26g, 26h, 26i.
5. For each segment 26a, 26b, 26c, 26d, 26e, 26f, 26g, 26h, 26i:
   Rotating stimulus points and filtered gaze points, so that a line fit over stimulus points builds an angle of $\theta=45'$ to the x-axis of the coordinate system.
   Excluding outliers and calculate correlation measure. Creating mask of data points that are above defined correlation threshold.
6. Using regularization criteria to determine the complexity of the regression model M that will be used:
   a. Selecting model M with the highest complexity.
   b. For the selected (unfiltered) data apply RANSAC algorithm to identify outliers.
   c. Checking if the result satisfies regularization criteria, d. else downgrade the model M complexity and repeat steps b) and c).

7. Taking the data that passed correlation measure mask and RANSAC criteria. Applying robust least squares fit with the regression model M based on the Huber M-estimator. In statistics, M-estimators are a broad class of estimators, which are obtained as the minima of sums of functions of the data.

8. Repeating step 7 using regression models M that are one level above and one level below the selected model M complexity. If the model M is already of the highest (lowest) level of complexity only one available regression model M is fitted.

9. Calculate differences in the predicted gaze position at a predefined grid of points for three (two) models M from steps 7 and 8. If largest difference exceeds defined threshold use model M with lower complexity for the final result.

As a special case, a segment 26a, 26b, 26c, 26d, 26e, 26f, 26g, 26h, 26i of the data, i.e. gaze points P can also just include one (or more) fixation, for example if the stimulus S was static for a given time window.

If a fixation is detected, then the mean position within the fixation is computed and compared against the stimulus position at the matched time, and this is used as an additional data point, especially with a certain weight, in the calibration coefficients computation. Preferably, fixations are added with significant weight into M-estimator equation, or all (or almost all, some points are actually removed to address human reaction delays) gaze points associated with the fixations are added. This way the number of gaze points from fixations is comparable to that from the motion part.

Further, for defining the calibration model M and regularization criteria for predefined stimulus path 26, the following steps can be performed:

For each segment 26a, 26b, 26c, 26d, 26e, 26f, 26g, 26h, 26i of the stimulus path 26 (e.g. for segments 26a, 26b, 26c, 26d, 26e, 26f, 26g, 26h, 26i/lines in the rectangular path) the quality of the gaze data P is tested:

1. The number of points P for each segment 26a, 26b, 26c, 26d, 26e, 26f, 26g, 26h, 26i after correlation measure mask and RANSAC selection criteria should be larger than defined threshold.

2. Each segment 26a, 26b, 26c, 26d, 26e, 26f, 26g, 26h, 26i is classified as:
   a) short: $t_{short} \leq$ time ratio $\leq t_{long}$; where for example $t_{short}=0.3$ and for example $t_{long}=0.6$ $g_{ong}$
   b) long: time ratio$>t_{long}$; where for example $t_{long}=0.6$ where $$\text{time ratio} = \frac{t_{last\ gaze\ point} - t_{first\ gaze\ point}}{t_{last\ stimulus\ point} - t_{first\ stimulus\ point}}$$

3. If only one segment 26a, 26b, 26c, 26d, 26e, 26f, 26g, 26h, 26i (short or long) is found, additional quality measure is enforced. It is preferred that number of data points that pass correlation measure mask and RANSAC should be at least 40% from the total number of data points for this segment 26a, 26b, 26c, 26d, 26e, 26f, 26g, 26h, 26i.

In addition, if the regression fit returns coefficients that are outside expected range, the model M with lower complexity level will be selected.

So also the number of long and/or short segments, which are denoted in FIG. 5 by "L" and "S", respectively, especially wherein e.g. "4L" means four long segments, can constitute another control parameter T in dependency of which the most suitable model M is selected for the calibration. In particular, FIG. 5 shows an example how corresponding models M can be chosen in dependency of the number of respective long L and/or short segments S for a rectangular path RP, which in this example was divided into four segments, and each segment corresponds to a side of the rectangle, and for a cross calibration path CP, which in this example was divided into two segments, which constitute the respective lines that constitute the cross.

So generally, the calibration model M, M1, M2, M3, M4, M5, M6 can be selected in dependency of one or more control parameters, like the number N of valid gaze points and/or the temporal and/or spatial length T of segments of valid gaze points P, especially with respect to the temporal and/or spatial length of the corresponding segments of the trajectory 26 of the stimulus object S.

Finally, when a calibration model M is selected e.g. according to one of the above described procedures, the respective calibration parameters of this model M are determined on the basis of the valid gaze points P with respect to the defined trajectory 26 of the stimulus object S. Applying this calibrated model M with the determined calibration parameter to the calibrated gaze points P leads to the result illustrated in FIG. 4, wherein the calibrated gaze points are denoted by P', and wherein exemplarily again only one of these calibrated gaze points P' is shown with a reference sign.

Furthermore, above described control parameters for controlling the execution of the calibration procedure cannot only be used to control the final calculation of the calibration parameters, but additionally or alternatively can also be used to control the displaying of the stimulus object S. This is now described with regard to FIG. 6.

FIG. 6 shows a schematic flow chart for illustrating a method for performing a calibration procedure according to another embodiment of the invention.

The method starts in step S10, in which the stimulus object S is shown and moving along a first segment of the trajectory 26, and the corresponding gaze points P of the user 18 are calculated. For this first segment the determined gaze points P are then classified as being valid or invalid according to least one validity criterion in step S12. Then in step S14, the capability of the user to follow the stimulus object S is determined as the number of valid gaze points P with respect to the first segment divided by the total number of gaze points P for this first segment. After that, in step S16 it is checked whether the capability of the user to follow the stimulus object S is below a threshold. If this is the case, in step S18 the way the stimulus object S is displayed is changed or adapted for the next segment of the trajectory 26. This change can imply that for example the velocity of the movement of the stimulus object S is modified, e.g. reduced to make it easier for the user to follow the stimulus object S, or also increased to attract more attention of the user. Furthermore, also the form and/or size and/or color of the stimulus object S can be adapted and changed, on the one hand to be better be visible for the user and on the other hand again to attract more attention. This procedure can then be repeated for the next segment of the trajectory 26. In case that in step S16 it is determined that the capability of the user to follow that stimulus object S is above the threshold, the displaying of the stimulus object S can be repeated for the next segment in unmodified manner. Alternatively, also in this case the showing of the stimulus object S can be modified in step S20, e.g. by increasing the velocity of the stimulus object S to speed up the calibration procedure or gather more gaze data in the same time.

This procedure can be performed until a certain termination criterion is fulfilled. Such a termination criterion can be a certain quality that has to be achieved or also a time limit.

To conclude the invention and its embodiments provide a method and an eye tracking system which makes use of the fact that users' gaze and head motion are associated with the motion of the stimulus and correlation measure can be built to estimate the probability of the user following the stimulus with gaze. Moreover, data that satisfy correlation measure threshold can further be cleaned from noise and samples that are not consistent with underling model of human following the stimulus with the gaze. This model can take into account geometrical corrections required to calibrate eye tracker device as well as user's behavioral data and ability to follow a moving object. Parameters of this model can be determined from fitting the model to the measured data. The model M can have different levels of complexity, which can be automatically selected based on characteristics of the input data. Also, the algorithm is able to interactively react on user's performance in following of the stimulus with the gaze, adapting the process to achieve the best result. Moreover, the algorithm can estimate expected calibration accuracy level and provides user's performance evaluation. Further, while motion is used as a feature to determine user's engagement, this method is also able to detect and use fixations present in the data, for example if the stimulus motion is paused for some time window in-between motions, or if the user at times is fixating his gaze.

Therefore, a method can be provided to calibrate an eye tracking device by displaying a stimulus on a display, wherein a dynamic matching is established between the stimulus motion and/or position and the user eye motion and/or position and orientation. Moreover, the user ability to follow the stimulus can be determined and used to adapt a calibration model. Also the motion path, velocity and stimulus appearance can be modified in dependence of the determined user ability to follow the stimulus, and the coverage of the user field of view where sufficient quality data was collected can be determined. A calibration can be performed using an adaptive model based on amount, quality and field of view coverage of the matched gaze samples. Further, the display of the calibration stimulus can be stopped once a termination criterion is reached, and the calibration is then performed by applying an adaptive model. The system according to the invention or its embodiments comprises an eye tracking device, a processing unit connected to said eye tracking device, and a means to display images to a user, and is configured to perform the eye tracking calibration according to the method according to the invention and/or its embodiments.

The invention or its embodiments therefore can apply an adaptive calibration model, which takes into account a number of parameters such as the desired calibration time, the calibration quality, the user engagement and his capability to follow and performs the best possible calibration within said specified constraints.

LIST OF REFERENCE SIGNS 10 eye tracking system
12 eye tracking device
14 camera
16 eye
16a cornea
16b pupil
18 user
20 display device
22 display area
22a-22i subareas
24 processing unit
26 trajectory
26a-26i segments
27 gaze direction
28 marked areas with invalid gaze points
A, A1-A8 number of subareas with sufficient valid gaze points
a1-a14 calibration parameter
a, b, r calibration parameter
C complexity of the model
CC center of the cornea
CP cross calibration path
D, D1-D8 distribution
F fovea
K distance between center of the pupil and center of the cornea
M, M1-M6 model
N total number of gaze points
N1-N8 minimum total number of gaze points
O order of the model
OA optical axis
P uncalibrated gaze point
P' calibrated gaze point
Q quality value
R radius of the cornea
RP rectangular calibration path
S stimulus object
T control parameter
VA visual axis
$\theta$ angular offset

The invention claimed is:

1. A method comprising:
   at a device with one or more processors, non-transitory memory, a camera, and a display:
      displaying, on the display, a stimulus object having a size and a shape moving along a trajectory at a movement speed;
      while displaying the stimulus object, capturing, via the camera, images of an eye of a user;
      determining, based on the captured images, a plurality of gaze points of the user;
      determining, based on the plurality of gaze points with respect to the trajectory of the stimulus object, a calibration parameter of a predefined calibration model;
      determining, based on the gaze points of the user, a control parameter; and
      continuing display of the stimulus object by adapting, based on the control parameter, at least one of the size, the shape, the trajectory, or the movement speed.

2. The method of claim 1, wherein continuing display of the stimulus object includes adapting, based on the control parameter, the size.

3. The method of claim 1, wherein continuing display of the stimulus object includes adapting, based on the control parameter, the shape.

4. The method of claim 1, wherein continuing displaying of the stimulus object includes adapting, based on the control parameter, at least one of the trajectory or the movement speed.

5. The method of claim 1, wherein determining the control parameter includes classifying a subset of the gaze points as valid or invalid according to a predefined criterion.

6. The method of claim 5, wherein the control parameter defines a capability of the user to follow the displayed stimulus object based on a number of valid gaze points in comparison to a number of invalid gaze points.

7. The method of claim 6, wherein adapting at least one of the size, the shape, the trajectory, or the movement speed includes increasing the size based on the capability of the user being lower than a predefined threshold.

8. The method of claim 6, wherein adapting at least one of the size, shape, the trajectory, or the movement speed includes repeating a portion of the trajectory based on the capability of the user being lower than a predefined threshold.

9. The method of claim 6, wherein adapting at least one of the size, the shape, the trajectory, or the movement speed includes reducing the movement speed based on the capability of the user being lower than a predefined threshold.

10. A device comprising:
- a display to display a stimulus object having a size and a shape moving along a trajectory at a movement speed;
- a camera to capture images of an eye of a user while the stimulus object is displayed;
- a processor to:
  - determine, based on the captured images, a plurality of gaze points of the user;
  - determine, based on the plurality of gaze points with respect to the trajectory of the stimulus object, a calibration parameter of a predefined calibration model;
  - determine, based on the gaze points of the user, a control parameter; and
  - continue display of the stimulus object by adapting, based on the control parameter, at least one of the size, the shape, the trajectory, or the movement speed.

11. The device of claim 10, wherein the processor is to continue display of the stimulus object by adapting, based on the control parameter, the size.

12. The device of claim 10, wherein the processor is to continue display of the stimulus object by adapting, based on the control parameter, the shape.

13. The device of claim 10, wherein the processor is to continue display of the stimulus object by adapting, based on the control parameter, at least one of the trajectory or the movement speed.

14. The device of claim 10, wherein the processor is to determine the control parameter by classifying a subset of the gaze points as valid or invalid according to a predefined criterion.

15. The device of claim 14, wherein the control parameter defines a capability of the user to follow the displayed stimulus object based on a number of valid gaze points in comparison to a number of invalid gaze points.

16. A non-transitory computer-readable medium storing instructions which, when executed by a device including a display and a camera, causes the device to perform operations comprising:
- displaying, on the display, a stimulus object having a size and a shape moving along a trajectory at a movement speed;
- while displaying the stimulus object, capturing, via the camera, images of an eye of a user;
- determining, based on the captured images, a plurality of gaze points of the user;
- determining, based on the plurality of gaze points with respect to the trajectory of the stimulus object, a calibration parameter of a predefined calibration model;
- determining, based on the gaze points of the user, a control parameter; and
- continuing display of the stimulus object by adapting, based on the control parameter, at least one of the size, the shape, the trajectory, or the movement speed.

17. The non-transitory computer-readable medium of claim 16, wherein continuing display of the stimulus object includes adapting, based on the control parameter, at least one of the size or the shape.

18. The non-transitory computer-readable medium of claim 16, wherein continuing display of the stimulus object includes adapting, based on the control parameter, at least one of the trajectory or the movement speed.

19. The non-transitory computer-readable medium of claim 16, wherein determining the control parameter includes classifying a subset of the gaze points as valid or invalid according to a predefined criterion.

20. The non-transitory computer-readable medium of claim 19, wherein the control parameter defines a capability of the user to follow the displayed stimulus object based on a number of valid gaze points in comparison to a number of invalid gaze points.

* * * * *